(12) United States Patent
Pendar et al.

(10) Patent No.: US 11,755,376 B2
(45) Date of Patent: Sep. 12, 2023

(54) AUTOMATIC ASSIGNMENT OF HARDWARE/SOFTWARE RESOURCES TO DIFFERENT ENTITIES USING MACHINE LEARNING BASED ON DETERMINED SCORES FOR ASSIGNMENT SOLUTIONS

(71) Applicant: Callidus Software, Inc., Dublin, CA (US)

(72) Inventors: Nick Pendar, San Ramon, CA (US); Eric Christopher Hagen, Danville, CA (US)

(73) Assignee: CALLIDUS SOFTWARE, INC., Dublin, CA (US)

( * ) Notice: Subject to any disclaimer, the term of this patent is extended or adjusted under 35 U.S.C. 154(b) by 470 days.

(21) Appl. No.: 16/549,886

(22) Filed: Aug. 23, 2019

(65) Prior Publication Data

US 2021/0055973 A1 Feb. 25, 2021

(51) Int. Cl.
*G06F 9/50* (2006.01)
*G06N 20/00* (2019.01)
*G06N 3/126* (2023.01)

(52) U.S. Cl.
CPC .......... *G06F 9/5055* (2013.01); *G06F 9/5044* (2013.01); *G06N 3/126* (2013.01); *G06N 20/00* (2019.01)

(58) Field of Classification Search
None
See application file for complete search history.

(56) References Cited

U.S. PATENT DOCUMENTS

| 5,848,403 A * | 12/1998 | Gabriner | G06F 9/50 706/13 |
|---|---|---|---|
| 10,178,664 B1 * | 1/2019 | Mansour | H04W 52/243 |
| 10,599,471 B1 * | 3/2020 | Hilton | G06N 3/08 |
| 2006/0218551 A1 * | 9/2006 | Berstis | G06F 9/4881 718/102 |
| 2007/0276718 A1 * | 11/2007 | Doris | G06Q 10/06312 705/7.22 |
| 2010/0185480 A1 * | 7/2010 | Wang | G06Q 10/06 705/7.11 |

(Continued)

*Primary Examiner* — Meng T An
*Assistant Examiner* — Zujia Xu
(74) *Attorney, Agent, or Firm* — Buckley, Maschoff & Talwalkar LLC

(57) ABSTRACT

Task/resources are randomly assigned a number of times and a score for each solution of the random assignment is calculated. Using machine learning and artificial intelligence, a subset of the solutions is selected. Assignment of task/resource within the subset may be randomly changed, e.g., a task/resource assignment between two entities, a task/resource within the selected subset may be replaced with another task/resource (without swapping), etc. The additional solutions form a super solution with the selected subset and the score associated with the additional solutions are calculated. The process of selection of assignments, random changes to the assignment and calculating the scores associated with the new solutions is repeated a number of times until a certain condition is met, e.g., a number of iterations, time out, improvement between two iterations is less than a certain threshold, etc. Once the certain condition is satisfied, a solution is selected.

16 Claims, 12 Drawing Sheets

(56) References Cited

U.S. PATENT DOCUMENTS

| | | | | |
|---|---|---|---|---|
| 2014/0173113 A1* | 6/2014 | Vemuri | ............... | G06F 9/45558 |
| | | | | 709/226 |
| 2016/0226789 A1* | 8/2016 | Sundararajan | ...... | H04L 67/1008 |
| 2017/0308806 A1* | 10/2017 | Chao | ................. | G06F 16/24578 |
| 2018/0255122 A1* | 9/2018 | Hu | ........................ | G06F 9/445 |
| 2019/0020555 A1* | 1/2019 | Tayal | ................. | H04L 67/1012 |
| 2020/0261997 A1* | 8/2020 | Daniel | .................. | G06Q 10/06 |

* cited by examiner

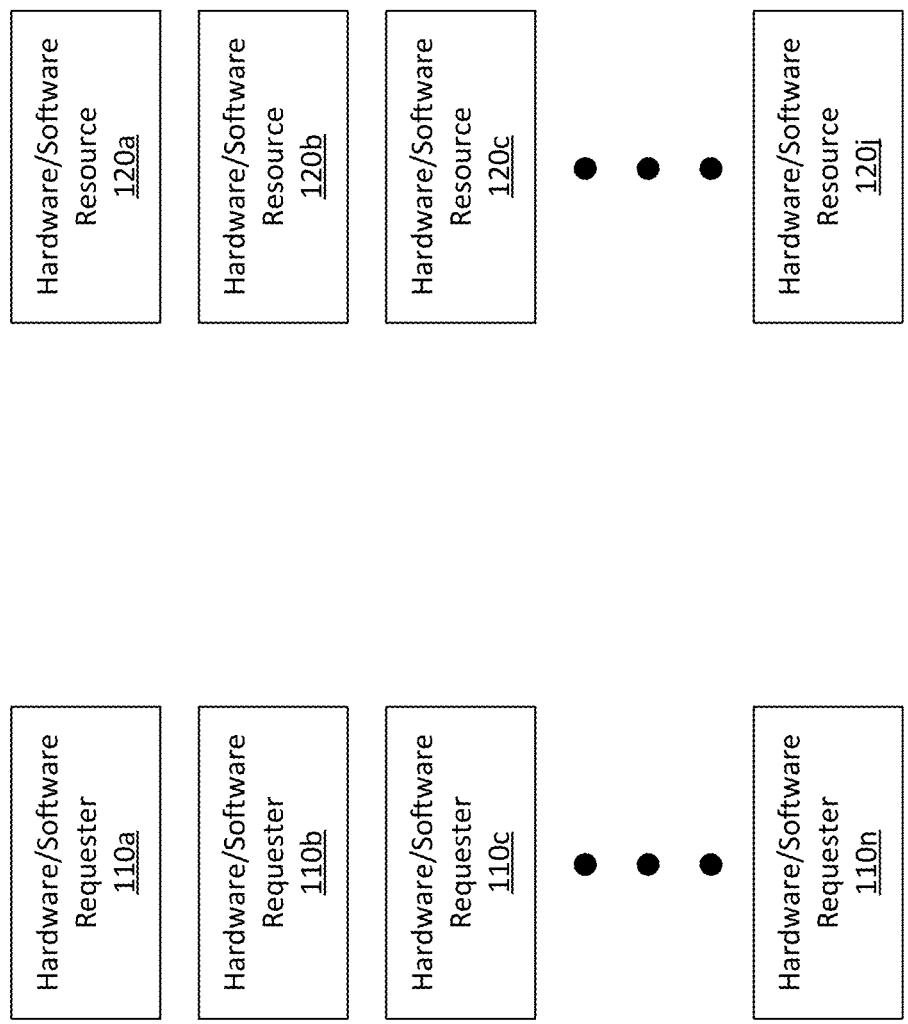

| Score | 131 | 132 | ... | 211 | 212 |
|---|---|---|---|---|---|
| Solution | 141 | 142 | ... | 201 | 202 |

FIG. 2C

AUTOMATIC ASSIGNMENT OF HARDWARE/SOFTWARE RESOURCES TO DIFFERENT ENTITIES USING MACHINE LEARNING BASED ON DETERMINED SCORES FOR ASSIGNMENT SOLUTIONS

BACKGROUND

In complex systems or networks, there may be a large number of factors to consider for any task distribution or assignment. For example, assignment of various hardware/software resources to different entities may involve a number of different factors, e.g., capacity, relationship between the entity and the resources, utilization, impact of other resource assignment, etc. It is appreciated that the task distribution and assignment is not limited to hardware/software resource assignments but more broadly applicable to any system, e.g., assignment of sales accounts to representatives, etc. Unfortunately, optimizing the assignment manually is very time consuming and not practical. Furthermore, brute force optimization requires a lot of processing power and becomes very time consuming as the number of tasks and resources to be assigned increases. For example, the number of possible solutions for "a" number of resources to be assigned to "r" number of entities is $r^a$. As such, as the number of resources and/or the number of entities increase the number of solutions also increase, thereby making the optimization of the task distribution and assignment using brute force impractical.

SUMMARY

Accordingly, there is a need for an efficient way to optimize task/resource assignment to entities. Moreover, a need has arisen to optimize the assignment in a time efficient manner and using less processing power, thereby saving CPU power and cost. The embodiments described herein provide for efficient task/resource assignment using artificial intelligence and machine learning. Tasks/resources are initially randomly assigned a number of times and a score for each solution of the random assignment is calculated. Using machine learning and artificial intelligence, a subset of the solutions is selected. Assignment of task/resource within the subset of the solutions may be randomly changed, e.g., a task/resource assignment between two entities within the selected subset may be swapped, a task/resource within the selected subset may be replaced with another task/resource (without swapping), etc. The additional solutions form a super solution with the selected subset and the score associated with the additional solutions are calculated. The process of selection of assignments, random changes to the assignment and calculating the scores associated with the new solutions is repeated a number of times. During each iteration the process is improved and optimized. In some embodiments, the process repeats until a certain condition is met, e.g., a number of iterations, time out, improvement between two iterations is less than a certain threshold, etc. Once the certain condition is satisfied, a solution is selected. The selected solution contains the assignment of tasks/resources that is optimized using artificial intelligence without using brute force, therefore achieving optimization with less processing power and in less time.

In some embodiments, a computing device includes one or more processors and a non-transitory computer-readable medium storing machine learning algorithm instructions that, when executed by one or more processors of the computing device, cause the computing device to perform operations. The operations include randomly assigning a plurality of hardware/software resources to a plurality of requesters of hardware/software resources to form a hardware/software resources assignment. The operations further include determining a score associated with the hardware/software resources assignment, wherein the score is indicative of fitness of the assignment. In some embodiments, the operations further include repeating the random assignment of the plurality of hardware/software resources and the determining the score a number of times to form a set of solutions. It is appreciated that the operations also include selecting a subset of the set of solutions to form a subset solutions wherein the selecting is based on sampling with replacement techniques from among the best of the plurality of hardware/software resources assignments over the number of times. Moreover, the operations include creating additional solutions by changing hardware/software resource assignments within the subset solutions, determining scores associated with the additional solutions, and repeating the selecting, the creating, and the determining scores for further additional solutions, based on unsupervised machine learning of the scores of the plurality of hardware/software resources assignments, until certain criteria are met. The operations also include finalizing assigning the plurality of hardware/software resources to the plurality of requesters by selecting a solution from a latest set of solutions, wherein the selecting the solution is based on a determined score when the certain criteria are met.

It is appreciated that the score indicative of fitness of the assignment is based on balance of work between the plurality of hardware/software resources, capacity associated with each hardware/software resource of the plurality of hardware/software resources, bandwidth and physical distance associated with each hardware/software resource and requester pair, and priority associated with resource requester.

In some embodiments, the operations further include assigning another plurality of hardware/software resources to a subset of requesters of the plurality of requesters, wherein the assigning the another plurality of hardware/software resources to the subset of requesters remains unchanged until the certain criteria are met. It is appreciated that the changing hardware/software assignments within the subset solutions includes swapping hardware/software resource assignments between requesters within the subset solutions. In some illustrative embodiments, the changing hardware/software resource assignments within the subset solutions includes randomly replacing a hardware/software resource assignment to a requester within the subset solutions with another hardware/software resource from the plurality of hardware/software resources.

It is appreciated that the certain criteria include a predetermined number of iterations, a system time out, improvement less than predetermined threshold from one iteration to another iteration, etc. It is appreciated that the machine learning algorithm may be an evolutionary algorithm, a genetic algorithm, etc.

In some embodiments, a computing device includes one or more processors and a non-transitory computer-readable medium storing machine learning algorithm instructions that, when executed by one or more processors of the computing device, cause the computing device to perform operations. The operations include randomly assigning a plurality of accounts to a plurality of representatives to form account assignment, determining a score associated with the account assignment, wherein the score is indicative of fitness of the account assignment, and repeating the random assignment and the determining the score a number of times to form a set of solutions. The operations further include selecting a subset of the set of solutions based on their respective score to form a subset of solutions, creating additional solutions by changing account assignments within the subset of solutions, determining scores associated with the additional solutions, and repeating the selecting, the creating, and the determining scores for further additional solutions until certain criteria are met. The operations further include finalizing assigning the plurality of accounts to the plurality of representatives by selecting a solution from a latest set of solutions, wherein the selecting the solution is based on a determined score when the certain criteria are met.

It is appreciated that the score indicative of fitness of the assignment is based on expertise of respective representative, balance of work between the plurality of representatives, distance associated with accounts and representatives, and account value. The operations may further include assigning another plurality of accounts to a subset of representatives of the plurality of representatives, wherein the assigning the another plurality of accounts to the subset of representatives remains unchanged until the certain criteria is met.

It is appreciated that the changing account assignment within the subset solutions includes swapping account assignments between representatives within the subset solutions. In some illustrative embodiments, the changing account assignments within the subset solutions includes randomly replacing an account assignment to a representative within the subset solutions with another account from the plurality of accounts.

According to some embodiments, the certain criteria includes a predetermined number of iterations, a system time out, improvement less than a predetermined threshold from one iteration to another iteration, etc.

The machine learning algorithm is an unsupervised machine learning algorithm, an evolutionary algorithm, a genetic algorithm, etc.

These and other features and aspects of the concepts described herein may be better understood with reference to the following drawings, description, and appended claims.

BRIEF DESCRIPTION OF THE FIGURES

FIG. 1A illustrates software/hardware resources unassigned to entities according to some embodiments.

FIG. 2C illustrates additional solutions created based on the changes to assignments within the selected subset.

DETAILED DESCRIPTION

Figure 1B:
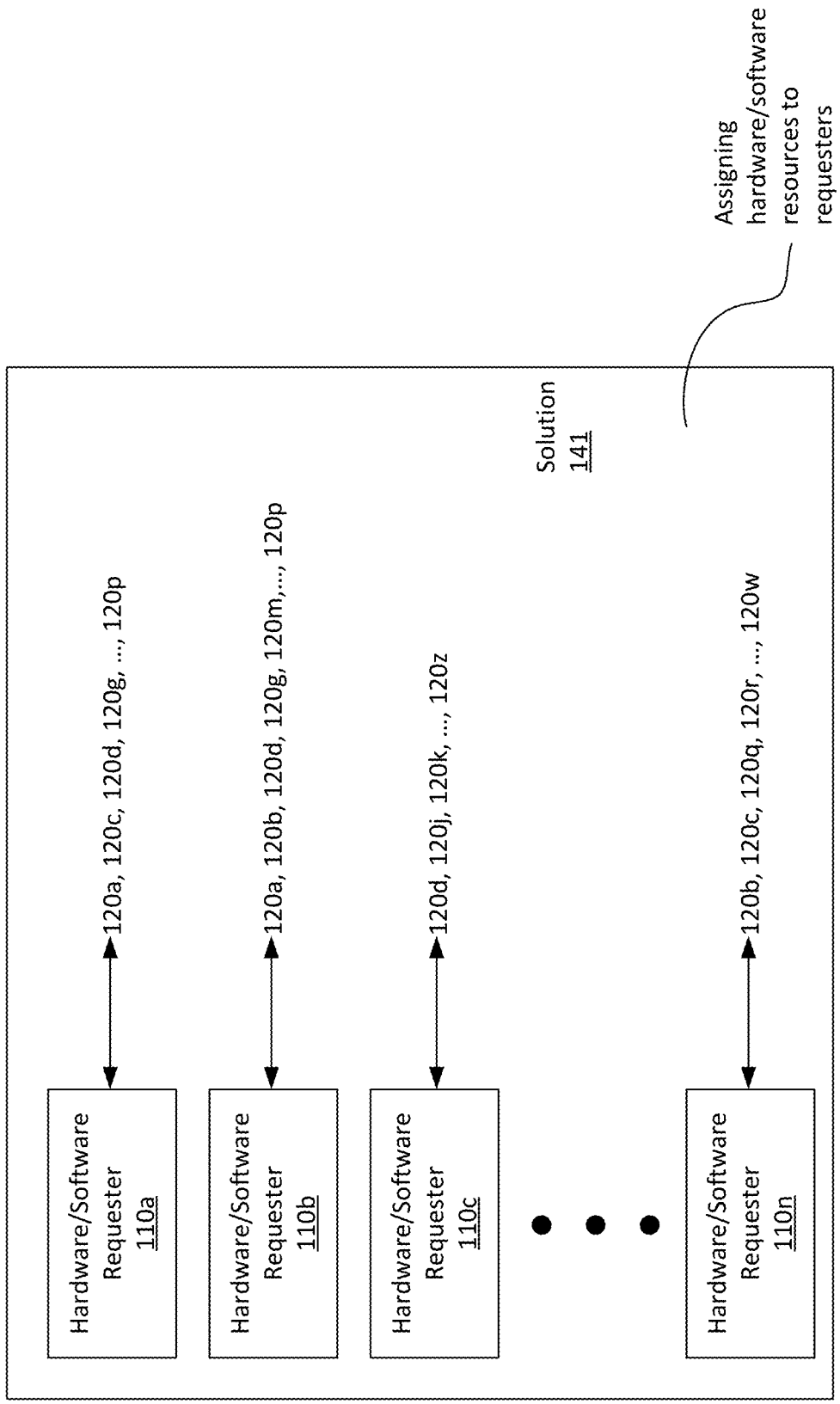
FIG. 1B illustrates random assignment of resources to entities according to some embodiments.

Before various example embodiments are described in greater detail, it should be understood that the embodiments are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein.

It should also be understood that the terminology used herein is for the purpose of describing concepts, and the terminology is not intended to be limiting. Unless defined otherwise, all technical and scientific terms used herein have the same meaning as commonly understood by those skilled in the art to which the embodiment pertains.

Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that the singular forms of "a," "an," and "the" include plural references unless the context clearly dictates otherwise.

Some portions of the detailed descriptions that follow are presented in terms of procedures, methods, flows, logic blocks, processing, and other symbolic representations of operations performed on a computing device or a server. These descriptions are the means used by those skilled in the arts to most effectively convey the substance of their work to others skilled in the art. In the present application, a procedure, logic block, process, or the like, is conceived to be a self-consistent sequence of operations or steps or instructions leading to a desired result. The operations or steps are those utilizing physical manipulations of physical quantities. Usually, although not necessarily, these quantities take the form of electrical, optical or magnetic signals capable of being stored, transferred, combined, compared, and otherwise manipulated in a computer system or computing device or a processor. These signals are sometimes referred to as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "storing," "determining," "sending," "receiving," "generating," "creating," "fetching," "transmitting," "facilitating," "providing," "forming," "detecting," "processing," "updating," "instantiating," "identifying," "contacting", "gathering", "accessing", "utilizing", "resolving", "applying", "assigning", "repeating", "selecting", "finalizing" or the like, refer to actions and processes of a computer system or similar electronic computing device or processor.

The computer system or similar electronic computing device manipulates and transforms data represented as physical (electronic) quantities within the computer system memories, registers or other such information storage, transmission or display devices.

It is appreciated that present systems and methods can be implemented in a variety of architectures and configurations. For example, present systems and methods can be implemented as part of a distributed computing environment, a cloud computing environment, a client server environment, hard drive, etc. Example embodiments described herein may be discussed in the general context of computer-executable instructions residing on some form of computer-readable storage medium, such as program modules, executed by one or more computers, computing devices, or other devices. By way of example, and not limitation, computer-readable storage media may comprise computer storage media and communication media. Generally, program modules include routines, programs, objects, components, data structures, etc., that perform particular tasks or implement particular data types. The functionality of the program modules may be combined or distributed as desired in various embodiments.

Although the diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, and wherein the multiple hosts can be connected by one or more networks.

Computer storage media can include volatile and non-volatile, removable and non-removable media implemented in any method or technology for storage of information such as computer-readable instructions, data structures, program modules, or other data. Computer storage media can include, but is not limited to, random access memory (RAM), read only memory (ROM), electrically erasable programmable ROM (EEPROM), flash memory, or other memory technology, compact disk ROM (CD-ROM), digital versatile disks (DVDs) or other optical storage, solid state drives, hard drives, hybrid drive, or any other medium that can be used to store the desired information and that can be accessed to retrieve that information.

Communication media can embody computer-executable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared and other wireless media. Combinations of any of the above can also be included within the scope of computer-readable storage media.

As discussed above, there is a need for an efficient way to optimize task/resource assignment to entities. Moreover, a need has arisen to optimize the assignment in a time efficient manner and using less processing power, thereby saving CPU power and cost. The embodiments described herein provide for efficient task/resource assignment using artificial intelligence and machine learning.

Task/resources are initially randomly assigned a number of times and a score for each solution of the random assignment is calculated. Using machine learning and artificial intelligence, a subset of the solutions is selected. Assignment of task/resource within the subset of the solutions may be randomly changed, e.g., a task/resource assignment between two entities within the selected subset may be swapped, a task/resource within the selected subset may be replaced with another task/resource (without swapping), etc. The additional solutions form a super solution with the selected subset and the score associated with the additional solutions are calculated. The process of selection of assignments, random changes to the assignment and calculating the scores associated with the new solutions is repeated a number of times. During each iteration the process is improved and optimized. In some embodiments, the process repeats until a certain condition is met, e.g., a number of iterations, time out, improvement between two iterations is less than a certain threshold, etc. Once the certain condition is satisfied, a solution is selected from the final set of solutions. The selected solution contains the assignment of task/resources that is optimized using artificial intelligence and machine learning without using brute force, therefore achieving optimization with less processing power and in less time.

Referring now to FIG. 1A, software/hardware resources unassigned to entities according to some embodiments is shown. In this embodiments, hardware/software requesters 110a, 110b, 110c, . . . , 110n are shown that are unassigned to hardware/software resources 120a, 120b, 120c, . . . , 120j. It is appreciated that a requester may be an entity, e.g., a computing device, a server, a processing unit, etc., that is requesting for a hardware/software resource(s), e.g., memory component, software, processing unit, database, etc., to be assigned to it for a particular task. It is appreciated that the embodiments are described with respect to hardware/software requesters requesting software/hardware resources to be assigned for illustration purposes only and should not be construed as limiting the scope of the embodiments. For example, the embodiments are equally applicable to any type of assignment optimization, e.g., assignment of accounts to representatives, assignment of territories to representatives, assignment components to different networks, etc. Moreover, it is appreciated that the number of requesters and resources shown are for illustrative purposes only and should not be construed as limiting the scope of the embodiments.

Referring now to FIG. 1B, random assignment of resources to entities according to some embodiments is shown. In this embodiment, a set of resources (i.e. software/hardware resources) are assigned to each hardware/software requester. In some embodiments, the assignment of the hardware/software resources to hardware/software requester is completely random. In other embodiments, some of the assignments are set (i.e., as indicated by a user) while other assignments are random. In this embodiment, hardware/software resources 120a, 120c, 120d, 120g, . . . , 120p are assigned to the hardware/software requester 110a. In contrast, hardware/software resources 120a, 120b, 120d, 120g, 120m, . . . , 120p are assigned to hardware/software requester 110b. It is appreciated that in some embodiments there may be an overlap of the assignment of the resources to the requesters. For example, hardware/software resource 120a, 120d, 120g, and 120p are shared between the hardware/software requesters 110a and 110b. In this example, some of the assignments may be random while others may be nonrandom and may be based on some heuristics or based on a user input. For example, hardware/software resource 120a assigned to hardware/software requester 110a may be based on heuristics or may be based on a user input while other assignments to the hardware/software requester 110a may be completely random. Similarly, other assignments for each requester and resource may contain a combination of random and nonrandom assignment or a completely random assignment. In this illustrative embodiment, hardware/software resource 120d, 120j, 120k, . . . , 120z may be assigned to hardware/software requester 110c (randomly or a combination of random and nonrandomly as described above). It is appreciated that hardware/software resources 120b, 120c, 120q, 120r, . . . , 120w may be assigned to hardware/software requester 110n similar to other assignments above. As discussed above, the embodiments described are for illustrative purposes and should not be construed as limiting the scope. As such, the process is equally applicable to assignments of accounts to representatives, assignment of territories to accounts, assignments of territories to representatives, etc. It is appreciated that other requesters may also be assigned resources similar to the process described above. As such, a first solution 141 is created.

Figure 1C:
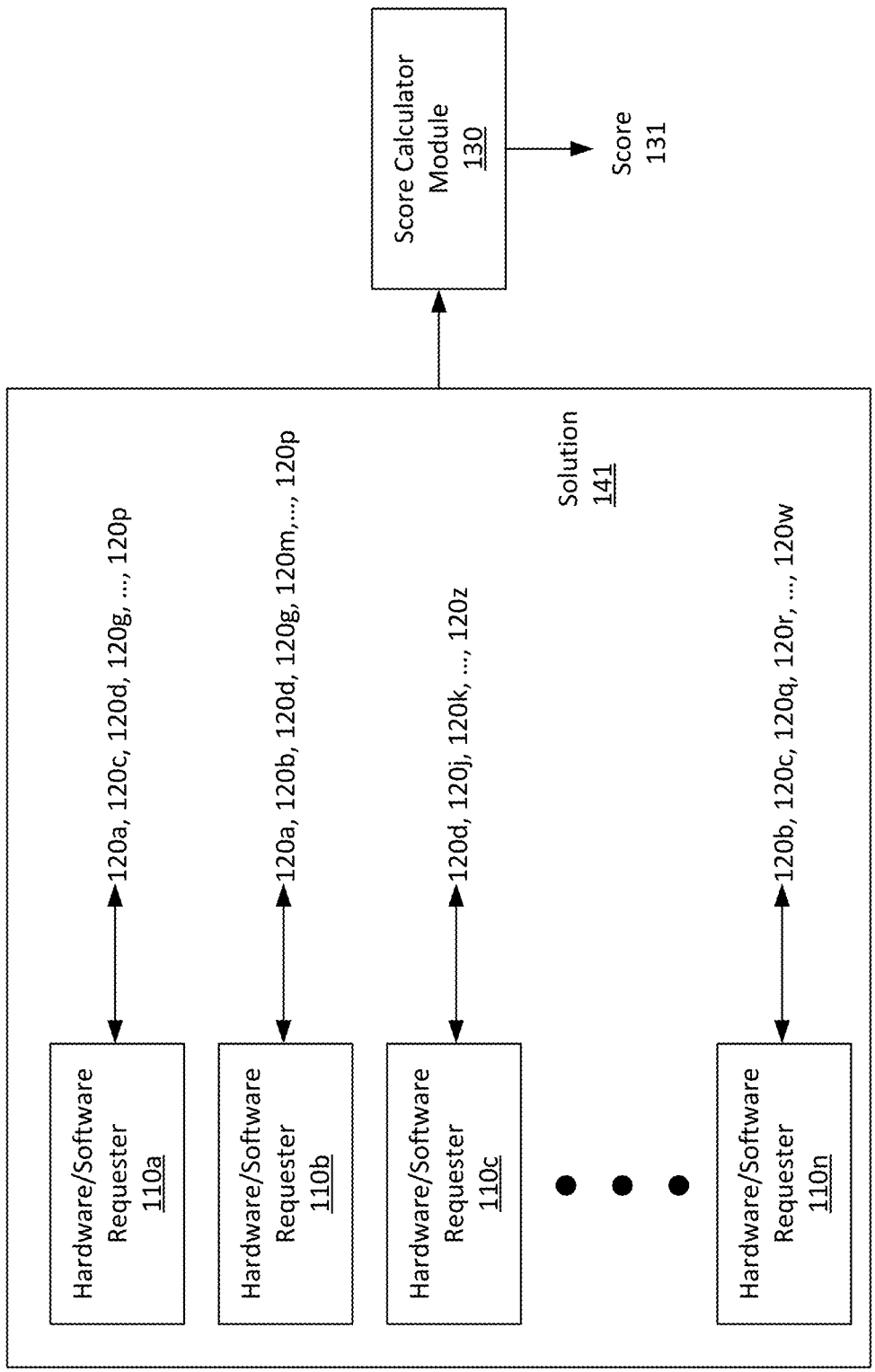
FIG. 1C illustrates a score calculation according to some embodiments.

Referring now to FIG. 1C, a score calculation according to some embodiments is shown. A score 131 associated with solution 141 is calculated using a score calculator module 130. It is appreciated that depending on the application the score may be calculated differently and based on different factors. For example, in the illustrative embodiment of assigning hardware/software resources to requesters, the score may be indicative of fitness of the assignment based on balance of work between various hardware/software resources, capacity associated with each hardware/software resource, bandwidth and physical distance associated with each hardware/software resource and requester pair, priority associated with the requester, etc. In contrast, in illustrative example of assigning accounts to representatives, the score may be calculated based on expertise of respective representative, balance of work between the representatives, distance associated with the accounts and representatives, account value, etc. In some embodiments, the score may be normalized.

Figure 1D:
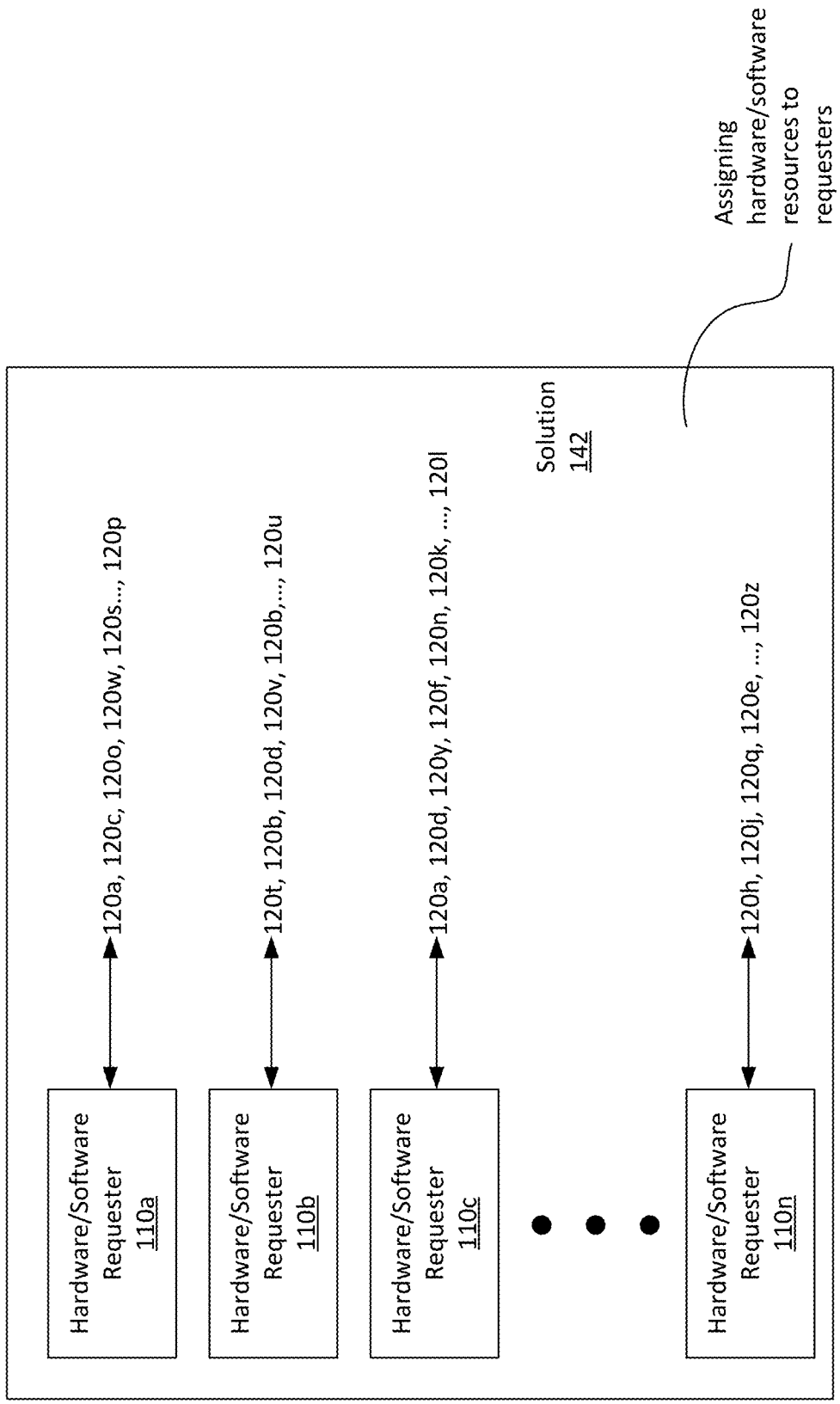
FIG. 1D illustrates another random assignment of resources to entities according to some embodiments.
Figure 1E:
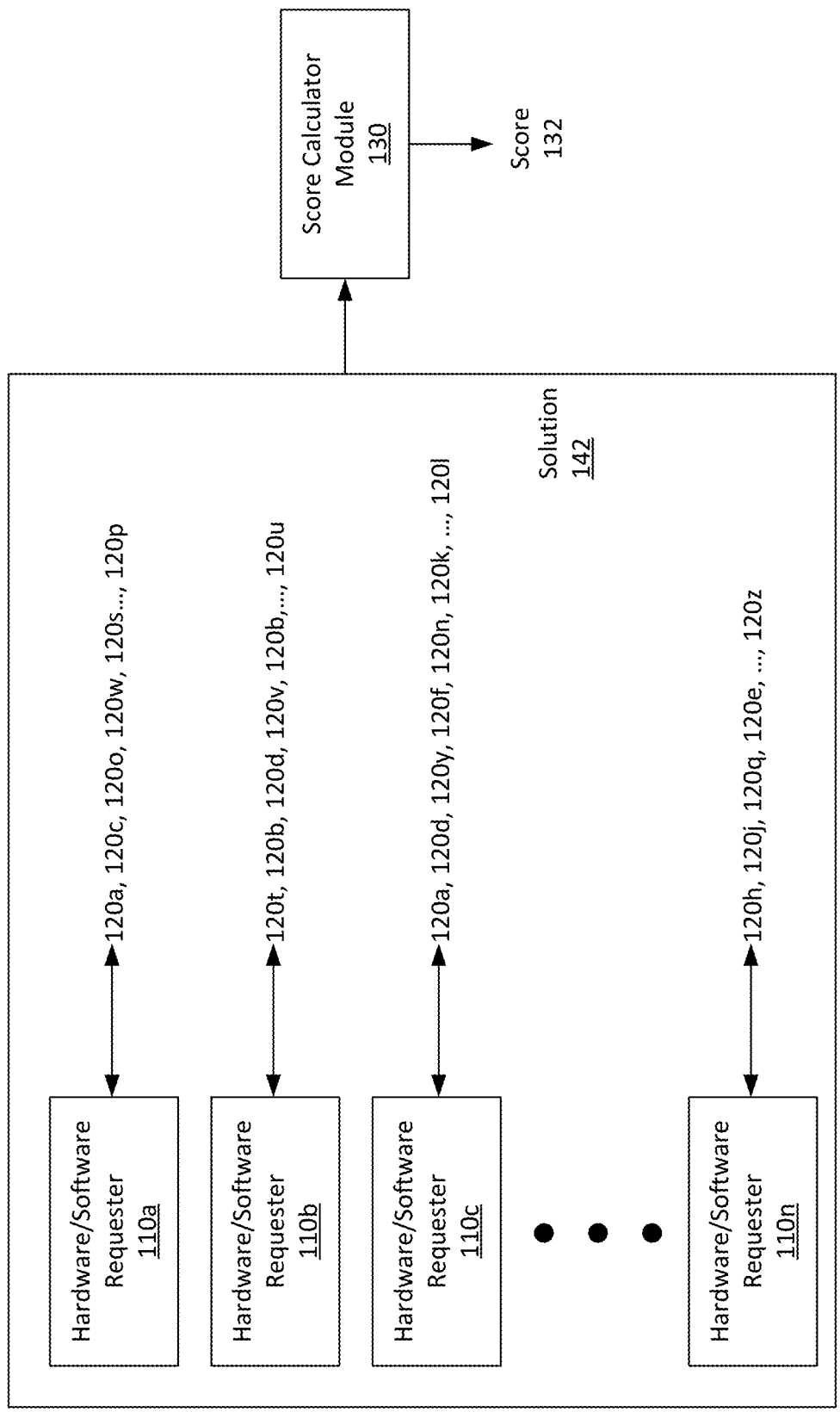
FIG. 1E illustrates another score calculation according to some embodiments.

It is appreciated that the process described in FIGS. 1B-1C is repeated a number of times, e.g., 10 times, or until a certain threshold period has expired, e.g., 5 seconds, etc. Referring now to FIG. 1D, another random assignment of resources to entities according to some embodiments is shown. In this example, hardware/software requester 110a is assigned hardware/software resources 120a, 120c, 120o, 120w, 120s, . . . , 120p. The hardware/software requester 120b is assigned hardware/software resources 120t, 120b, 120d, 120v, 120b, . . . , 120u. The hardware/software requester 120c is assigned hardware/software resources 120a, 120d, 120y, 120f, 120n, 120k, . . . , 120l, while hardware/software requester 110n may be assigned hardware/software resources 120h, 120j, 120q, 120e, . . . , 120z. Thus, solution 142 is formed. Similar to FIG. 1D, the score associated with solution 142 is calculated to be 132, as shown in FIG. 1E. As discussed above, the score may be normalized.

Figure 1F:
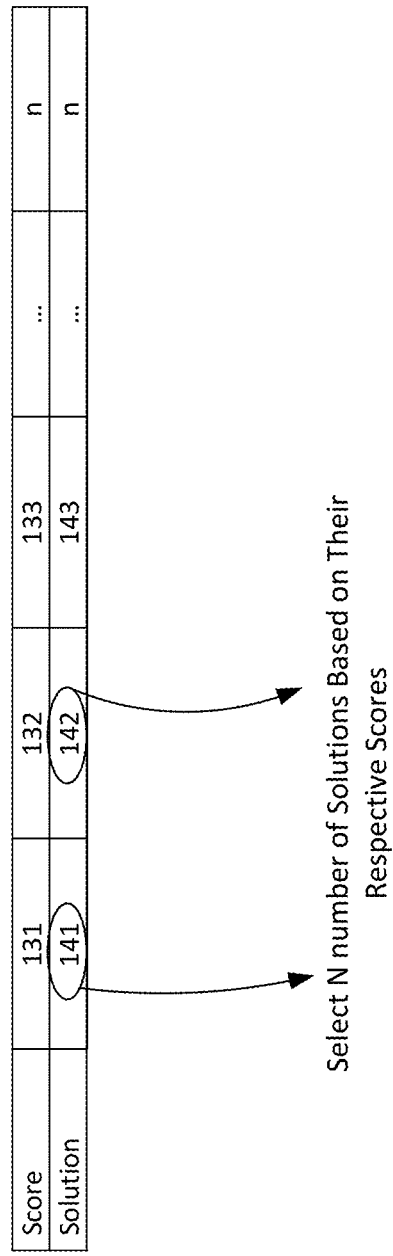
FIG. 1F illustrates a set of solutions based on the random assignments and their respective scores.

Referring now to FIG. 1F, a set of solutions based on the random assignments and their respective scores is shown. In this embodiment, n number of solutions are formed. For example, the solution set may include solutions 141, 142, 143, . . . , n. Each solution has a score associated therewith that may be normalized, e.g., scores 131, 132, 133, . . . , n. It is appreciated that a subset of the solutions may be selected. In some embodiments, the subset is selected based on the score values, e.g., top 5 highest scores, top 10 highest scores, etc. In some embodiments, the subset may be selected based on unsupervised machine learning of the scores of the plurality of hardware/software resources assignments over the number of times (i.e. n times in this example). In this illustrative example, two solutions are selected, using unsupervised machine learning, as the subset based on their score, hence solutions 141 and 142.

Figure 2A:
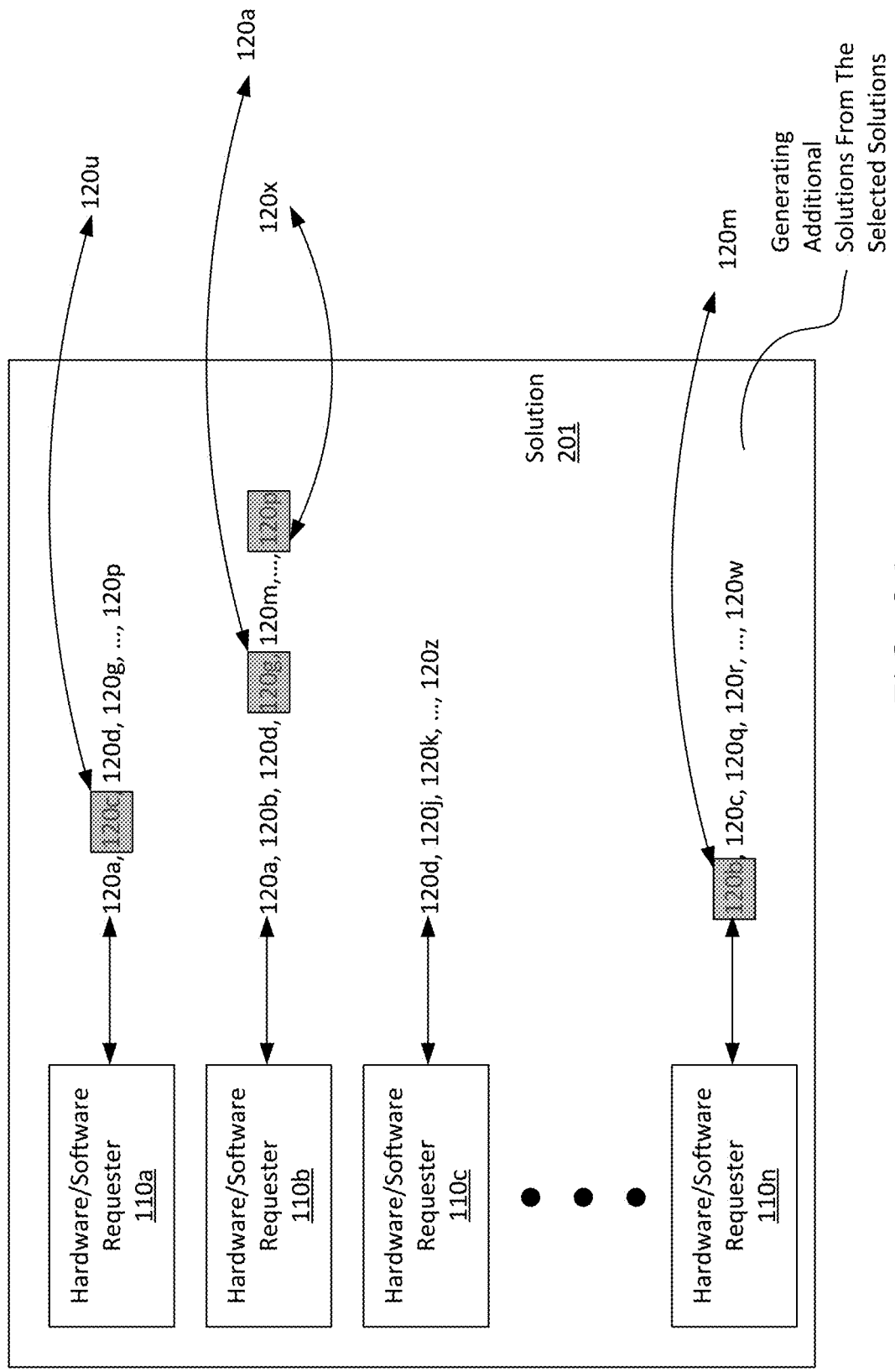
FIG. 2A illustrates changing assignment of resources to entities within the selected subset of solutions according to some embodiments.

Once the subset is formed, each solution may be altered to create additional solutions, e.g., superset of solutions. In this example, as shown in FIG. 2A, assignment of resources to entities within the selected subset of solutions is changed according to some embodiments is shown. For example, solution 141 may be altered to create additional solution 201. In this embodiment, assignment of hardware/software resource 120c to hardware/software requester 110a is randomly replaced with hardware/software resource 120u. Assignment of hardware/software resources of 120g and 120p to hardware/software requester 110b is randomly replaced with hardware/software resources 120a and 120x. It is appreciated that the random replacement may include replacing one hardware/software resource with an existing assignment. For example, hardware/software resource 120p assignment to hardware/software requester 110b is replaced with hardware/software resource 120a even though hardware/software resource 120a was previously assigned to hardware/software requester 120b. It is appreciated that in this illustrative example, the hardware/software resource assignment to hardware/software requester 110c remains unchanged (e.g., because it was randomly unchanged or because it was set based on heuristics or user input). In contrast, hardware/software resource 120b assigned to hardware/software requester 110n may be randomly replaced with hardware/software resource 120m. As such, solution 201 may be created from solution 141. It is appreciated that more than one solution may be formed from solution 141, e.g., 10 different solutions may be randomly formed. It is further appreciated that a similar process is carried out for each selected solution of the subset of solutions. For example, a similar process is carried out for solution 142. As such, a superset of solutions is formed. It is appreciated that as described above, a score associated with each solution is calculated and may be normalized. It is appreciated that the replacement of one hardware/software resource with another may be referred to as mutation. It is further appreciated that one resource may be replaced with more than one resource in some embodiments.

Figure 2B:
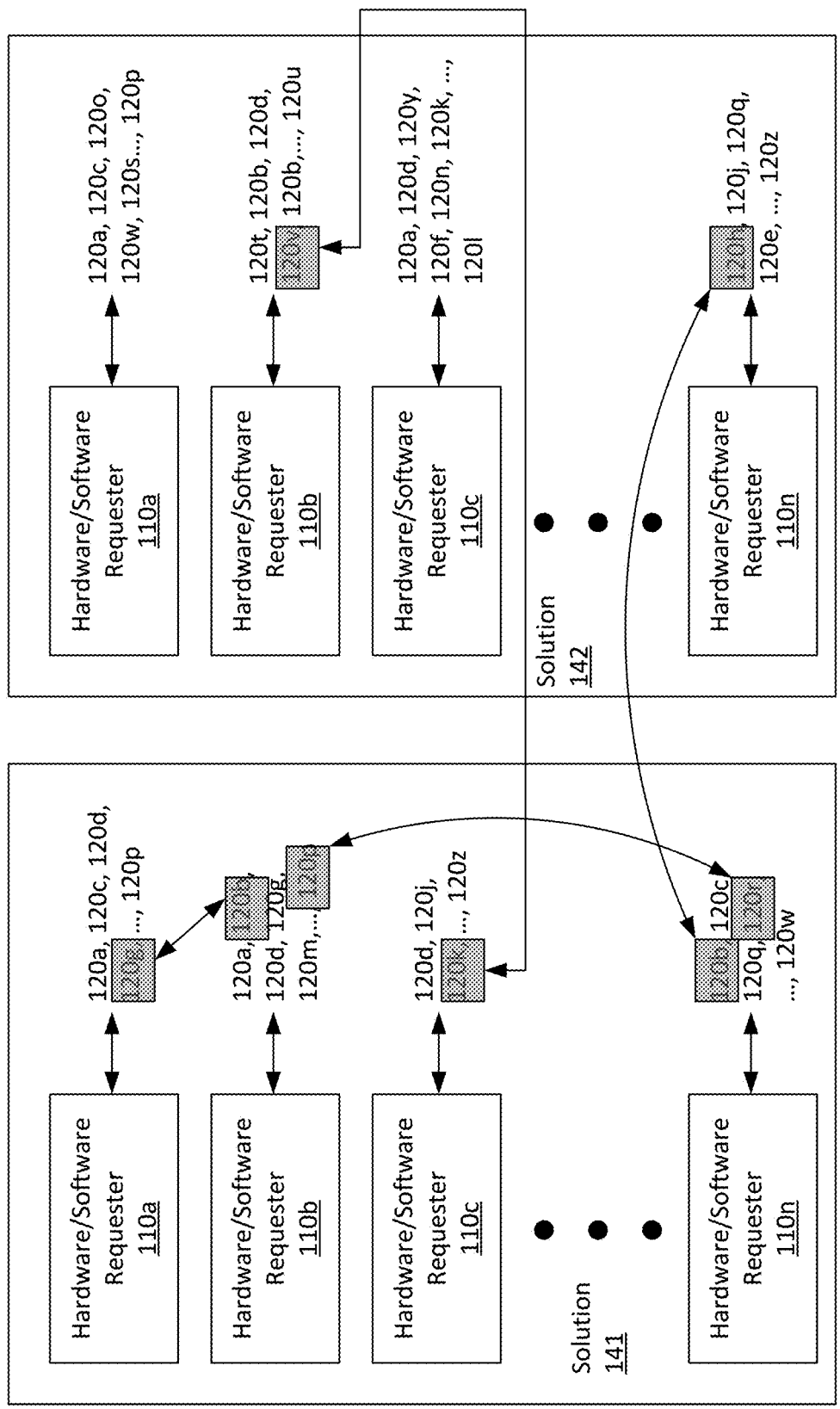
FIG. 2B illustrates another alternative for changing assignments within the selected subset of solutions according to some embodiments.

Referring now to FIG. 2B, another alternative for changing assignments within the selected subset of solutions according to some embodiments is shown. In this embodiment, assignment of hardware/software resources may be randomly swapped between different requesters within the same solution or between different requesters from different solutions. In this illustrative example, hardware/software resource 120g assigned to hardware/software requester 110a in solution 141 may be randomly swapped with hardware/software resource 120b assigned to hardware/software requester 110b. In this example, hardware/software resource 120p assigned to hardware/software requester 110b in solution 141 is randomly swapped with hardware/software resource 120r assigned to hardware/software requester 110n. According to some examples, hardware/software resource 120k assigned to hardware/software requester 110c in solution 141 may be swapped with hardware/software resource 120v assigned to hardware/software requester 110b in solution 142. Similarly, hardware/software resource 120b assigned to hardware/software requester 110n in solution 141 may be swapped with hardware/software resource 120h in solution 142.

It is appreciated that in this illustrative example, the hardware/software resource assignment to hardware/software requester 110c remains unchanged (e.g., because it was randomly unchanged or because it was set based on heuristics or user input). As such, additional solutions may be created from the subset of solutions 141 and 142. It is appreciated that more than one solution may be formed from the subset of solutions 141 and 142, e.g., 6 different solutions may be randomly formed. It is further appreciated that a similar process is carried out for each selected solution of the subset of solutions. For example, a similar process is carried out for other solutions if the subset of solutions would have had more than 2 solutions. As such, a superset of solutions is formed. It is appreciated that as described above, a score associated with each solution is calculated and may be normalized. It is appreciated that a user may associate weights in determining the score. As such, in some embodiments, the score may be normalized to account for specified weights. It is appreciated that the swapping of one hardware/software resource assignment to hardware/software requester (within the same solution or a different solution) with another may be referred to as mating. It is further appreciated that one resource may be swapped with more than one resource in some embodiments (e.g. two resources assigned to a requester may be replaced with five resources assigned to a different requester and vice versa). It is appreciated that in some embodiments, the mutation and/or mating, as described above may be performed based on machine learning.

Referring now to FIG. 2C, additional solutions created based on the changes to assignments within the selected subset are shown. In this illustrative example, solutions 141 and 142 from the original set create a superset of solutions with solutions 201, . . . , 202 based on mating/mutation, as described above. It is appreciated that a subset of the created superset of solutions may similarly be selected and the process is repeated until a certain condition is met, e.g., time out (e.g. system time out), a number of iterations has occurred (may be predetermined), improvement from one iteration to the next based on the score is less than a certain threshold (e.g. <0.5%), etc. It is further appreciated that the process described in FIGS. 1A-2C may be performed using unsupervised learning algorithm, genetic algorithm, evolutionary algorithm, etc.

Once the condition is met, a solution from the superset of solution, e.g., from the latest subset, may be selected as the solution that has an optimized assignment. It is appreciated that the selection of a solution from the superset of solutions after the condition is met may be based on the highest score. It is appreciated that some assignments may remain unchanged throughout this process, e.g., assignment of some resources to some requesters may remain unchanged, until the condition is met because the assignment may be user entered. As such, selection of the solution from the superset finalizes the assignment of the resources to requesters. It is appreciated that a similar process may be carried out for other applications, e.g., assignment of accounts (customer accounts) to representatives (sales representatives), assignment of accounts to territories (geographical territories), assignment of territories to representatives, etc.

Figure 3:
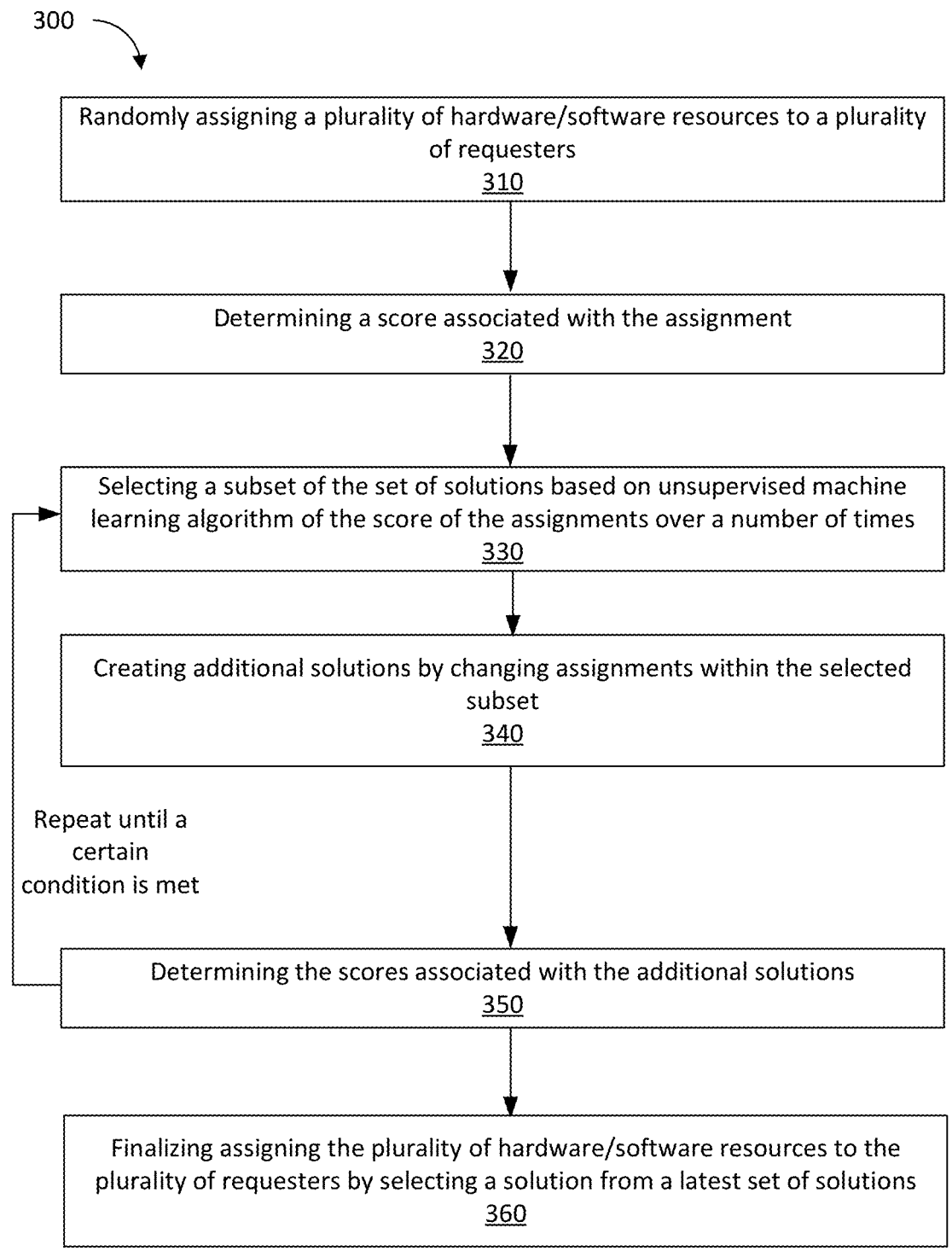
FIG. 3 shows an illustrative method for optimizing resource assignment according to some embodiments.

Referring now to FIG. 3, an illustrative method 300 for optimizing resource assignment according to some embodiments is shown. At step 310, a plurality of hardware/software resources are randomly assigned to a plurality of requesters, as described in FIG. 1B. At step 320, a score associated with the assignment (i.e. solution) is determined, as described in FIGS. 1C and 1E. The score may be normalized in some embodiments. The process is repeated a number of times, e.g., 10 times, 6 times, 20 times, or until a time is expired, as described in FIG. 1D. As such, a set of solutions is formed. It is appreciated that the formed set of solutions may also include assignments that are not random, e.g., user specified, based on heuristics, etc.

At step 330, a subset of solutions is selected, as described in FIG. 1F, based on the scores and in some embodiments based on unsupervised machine learning algorithm over the number of times, as described in repeating steps 310-320. At step 340, additional solutions are formed from the selected subset of solutions, e.g., by mating/mutation, as described above in FIGS. 2A and 2B. At step 350, the scores associated with the additional solutions is calculated, as described above and the process in steps 340 and 350 is repeated until a certain condition is met, e.g., system time out, a number of iterations has completed, improvement from one iteration to the next is less than a certain threshold such as 0.5%, etc. The score may be normalized in some embodiments.

Once the certain condition is met, the superset of solutions is created. A solution from the superset of solutions (e.g. latest set of solutions) may be selected. It is appreciated that the selection may be based on the respective score. Thus, at step 360, assignment of the plurality of hardware/software resources to a plurality of hardware/software requesters may be finalized. It is appreciated that in some embodiments, a solution may be selected from the superset at random because it may be presumed that the superset of solutions has achieved an improvement and optimization that are close to one another.

Figure 4:
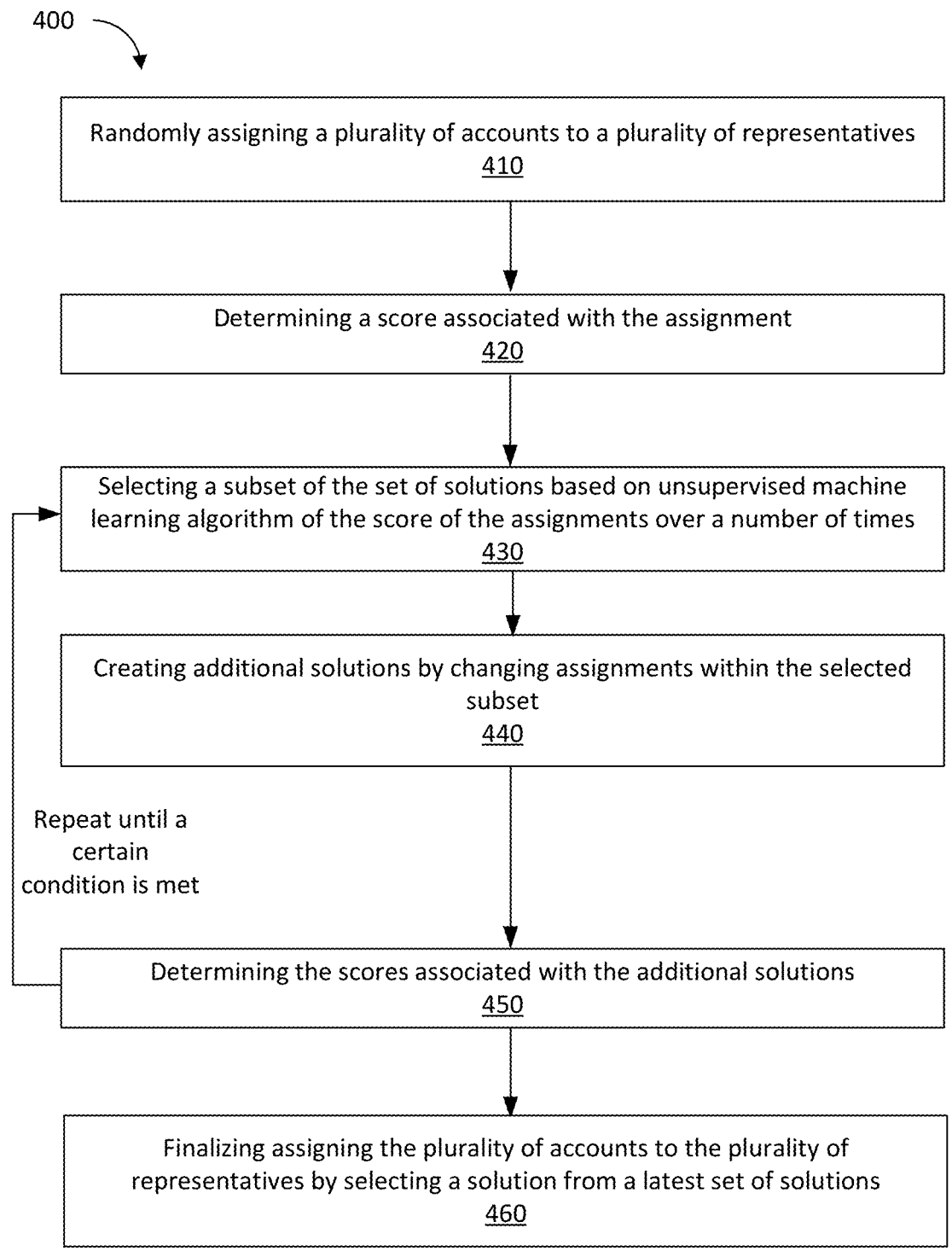
FIG. 4 shows an illustrative method for optimizing account assignment to representatives according to some embodiments.

Referring now to FIG. 4, an illustrative method 400 for optimizing account assignment to representatives according to some embodiments is shown. At step 410, a plurality of accounts is randomly assigned to a plurality of representatives, as described in FIG. 1B. At step 420, a score associated with the assignment (i.e. solution) is determined, as described in FIGS. 1C and 1E. The process is repeated a number of times, e.g., 10 times, 6 times, 20 times, or until a time is expired, as described in FIG. 1D. The score may be normalized in some embodiments. As such, a set of solutions is formed. It is appreciated that the formed set of solutions may also include assignments that are not random, e.g., user specified, based on heuristics, etc.

At step 430, a subset of solutions is selected, as described in FIG. 1F, based on the scores and in some embodiments based on unsupervised machine learning algorithm over the number of times, as described in repeating steps 410-420. At step 440, additional solutions are formed from the selected subset of solutions, e.g., by mating/mutation, as described above in FIGS. 2A and 2B. At step 350, the scores associated with the additional solutions are calculated, as described above and the process in steps 340 and 350 is repeated until a certain condition is met, e.g., system time out, a number of iterations has completed, improvement from one iteration to the next is less than a certain threshold such as 0.5%, etc. The score may be normalized in some embodiments.

Once the certain condition is met, the superset of solutions is created. A solution from the superset of solutions (e.g. latest set of solutions) may be selected. It is appreciated that the selection may be based on the respective score. Thus, at step 460, assignment of the plurality of accounts to a plurality of representatives may be finalized. It is appreciated that in some embodiments, a solution may be selected from the superset at random because it may be presumed that the superset of solutions has achieved an improvement and optimization that are close to one another.

Accordingly, assignment of hardware/software resources to requesters, or accounts to representatives becomes optimized without using brute force which is processing intensive and time consuming. In other words, the amount of time to optimize the assignment is not only reduced but the amount of processing power is reduced as well.

Figure 5:
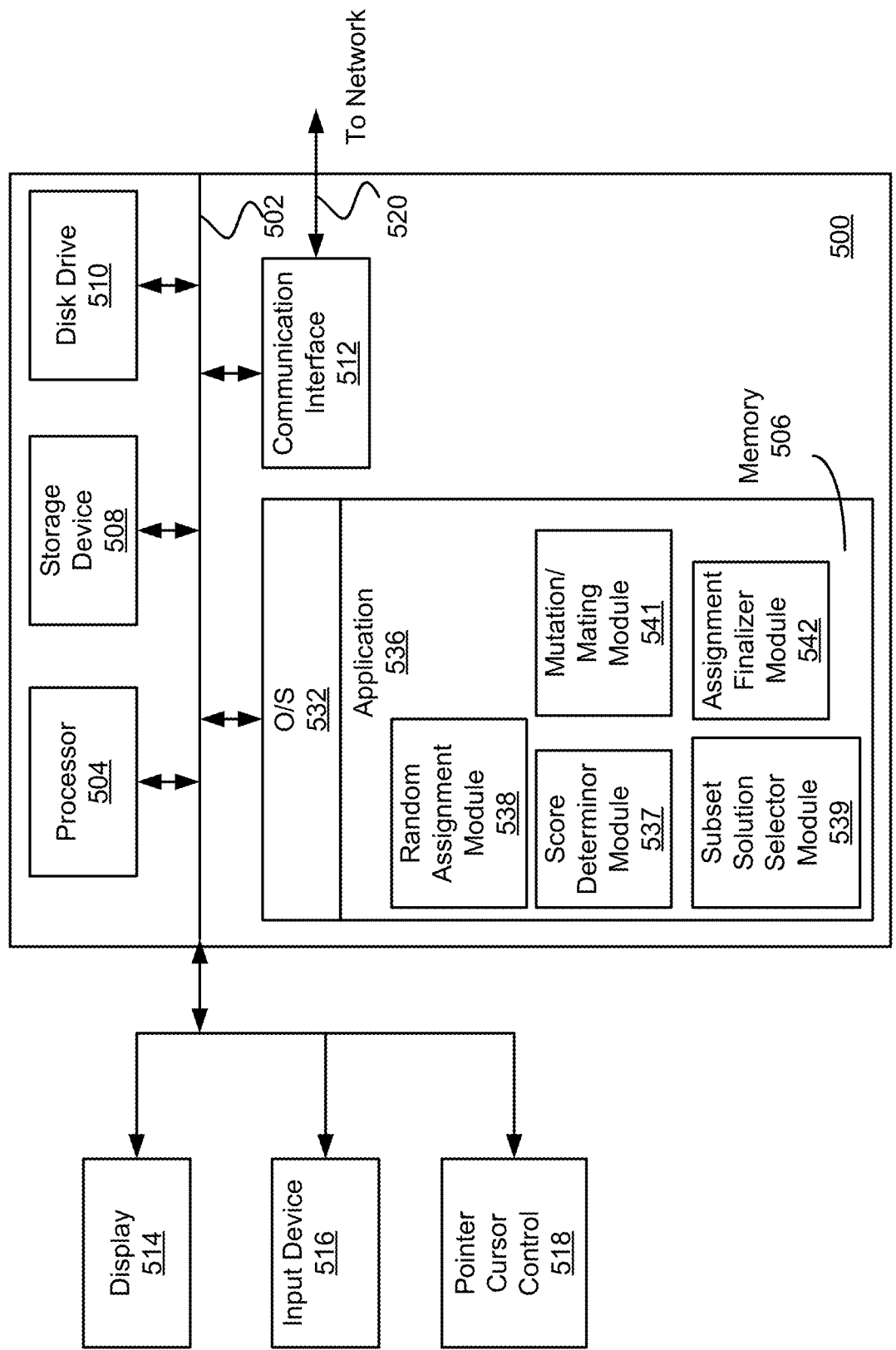
FIG. 5 shows a block diagram depicting an example of computer system suitable for optimizing resource assignment in accordance with some embodiments.

Referring now to FIG. 5, an exemplary block diagram of a computer system suitable for assignment optimization in accordance with some embodiments is shown. In some examples, computer system 500 can be used to implement computer programs, applications, methods, processes, or other software to perform the above-described techniques and to realize the structures described herein. The computer system 500 may include instructions to carry out the operations as described in FIGS. 3 and 4. Computer system 500 includes a bus 502 or other communication mechanism for communicating information, which interconnects subsystems and devices, such as a processor 504, a system memory ("memory") 506, a storage device 508 (e.g., ROM), a disk drive 510 (e.g., magnetic or optical), a communication interface 512 (e.g., modem or Ethernet card), a display 514 (e.g., CRT or LCD), an input device 516 (e.g., keyboard), and a pointer cursor control 518 (e.g., mouse or trackball). In one embodiment, pointer cursor control 518 invokes one or more commands that, at least in part, modify the rules stored, for example in memory 506, to define the electronic message preview process.

According to some examples, computer system 500 performs specific operations in which processor 504 executes one or more sequences of one or more instructions stored in system memory 506. Such instructions can be read into system memory 506 from another computer readable medium, such as storage device 508 or disk drive 510. In some examples, hard-wired circuitry can be used in place of or in combination with software instructions for implementation. In the example shown, system memory 506 includes modules of executable instructions for implementing an operation system ("O/S") 532, an application 536 (e.g., a host, server, web services-based, distributed (i.e., enterprise) application programming interface ("API"), program, procedure or others). Further, application 536 includes a random assignment module 538 that randomly assigns resources to requesters or assigns accounts to representatives. The application 536 further includes a score determinor module 537 to determine the score associated with each solution. The application 536 further includes a subset solution selector module 539 that is configured to select a subset of the solutions. The application 536 also includes a mutation/mating module 541 that generate additional solutions from the selected subset by replacing assignments or swapping assignments, as described above. The application 536 further includes assignment finalizer module 542 that is configured to select one solution from the set of solutions and finalize the assignments, as described above. It is appreciated that the operation of the random assignment module 538, score determinor module 537, subset solution selector module 539, mutation/mating module 541, and assignment finalizer module 542 are described in detail with respect to FIGS. 1A-4.

The term "computer readable medium" refers, at least in one embodiment, to any medium that participates in providing instructions to processor 504 for execution. Such a medium can take many forms, including but not limited to, non-volatile media, volatile media, and transmission media. Non-volatile media includes, for example, optical or magnetic disks, such as disk drive 510. Volatile media includes dynamic memory, such as system memory 506. Transmission media includes coaxial cables, copper wire, and fiber optics, including wires that comprise bus 502. Transmission media can also take the form of acoustic or light waves, such as those generated during radio wave and infrared data communications.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, electromagnetic waveforms, or any other medium from which a computer can read.

In some examples, execution of the sequences of instructions can be performed by a single computer system 500. According to some examples, two or more computer systems 500 coupled by communication link 520 (e.g., LAN, PSTN, or wireless network) can perform the sequence of instructions in coordination with one another. Computer system 500 can transmit and receive messages, data, and instructions, including program code (i.e., application code) through communication link 520 and communication interface 512. Received program code can be executed by processor 504 as it is received, and/or stored in disk drive 510, or other non-volatile storage for later execution. In one embodiment, system 500 is implemented as a hand-held device. But in other embodiments, system 500 can be implemented as a personal computer (i.e., a desktop computer) or any other computing device. In at least one embodiment, any of the above-described delivery systems can be implemented as a single system 500 or can implemented in a distributed architecture including multiple systems 500.

In other examples, the systems, as described above, can be implemented from a personal computer, a computing device, a mobile device, a mobile telephone, a facsimile device, a personal digital assistant ("PDA") or other electronic device.

In at least some of the embodiments, the structures and/or functions of any of the above-described interfaces and panels can be implemented in software, hardware, firmware, circuitry, or a combination thereof. Note that the structures and constituent elements shown throughout, as well as their functionality, can be aggregated with one or more other structures or elements.

Alternatively, the elements and their functionality can be subdivided into constituent sub-elements, if any. As software, the above-described techniques can be implemented using various types of programming or formatting languages, frameworks, syntax, applications, protocols, objects, or techniques, including C, Objective C, C++, C#, Flex™, Fireworks®, Java™, Javascript™, AJAX, COBOL, Fortran, ADA, XML, HTML, DHTML, XHTML, HTTP, XMPP, and others. These can be varied and are not limited to the examples or descriptions provided.

The various embodiments described herein may employ various computer-implemented operations involving data stored in computer systems. For example, these operations may require physical manipulation of physical quantities usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, receiving, transmitting, generating, aggregating, normalizing, creating, forming, correlating, analyzing, comparing, etc. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A computing device comprising:
   one or more processors;
   a non-transitory computer-readable medium storing machine learning algorithm instructions and an application including a random assignment generator, a score determiner, a subset solution selector, a mutation/mating generator, and an assignment finalizer that, when executed by the one or more processors of the computing device, cause the computing device to perform operations comprising:
   randomly assigning, by the random assignment generator, a set including a plurality of hardware/software resources from a plurality of hardware/software resources to each of a plurality of requesters of hardware/software resources to form a hardware/software resources assignment solution, where a portion of the set including the plurality of hardware/software resources from the plurality of hardware/software resources randomly assigned to each of the plurality of requesters of hardware/software resources overlap;
   determining, by the score determiner, a score associated with the hardware/software resources assignment solution, wherein the score is indicative of fitness of the hardware/software resources assignment solution;
   repeating, by the random assignment generator, the random assigning of a set of hardware/software resources from the plurality of hardware/software resources to the plurality of requesters of hardware/software resources to form a hardware/software resources assignment solution and the determining of the score associated with the hardware/software resources assignment solution a number of times to form a set of solutions, each solution in the set of solutions having a respective score associated therewith;
   selecting, by the subset solution selector, a subset of the set of solutions to form a subset of solutions based on an unsupervised machine learning of the scores of the plurality of hardware/software resources assignment solutions over the number of times;
   creating, by the mutation/mating generator, additional solutions by changing hardware/software resource assignments within the subset of solutions, the changing of hardware/software resource assignments within the subset of solutions includes randomly swapping the sets of hardware/software resources from the hardware/software resource assignments within the subset of solutions between the plurality of requesters of hardware/software resources within the subset solutions, including (i) randomly swapping sets of hardware/software resources between different requestors within a same solution and (ii) randomly swapping sets of hardware/software resources between different requestors from a different solution;
   determining, by the score determiner, scores associated with the additional solutions;
   repeating, by the respective subset solution selector, mutation/mating generator, and score determiner, the selecting, the creating, and the determining of scores for further additional solutions, based on the unsupervised machine learning of the scores of the plurality of hardware/software resource assignments, until a certain criteria is met, the criteria being one or more of an expiration of a threshold period, a determined number of iterations, and an improvement from one iteration to a next iteration based on the determined score is less than a determined threshold;
   finalizing, by the assignment finalizer, assigning of the plurality of hardware/software resources to the plurality of requesters by selecting a solution from a latest set of solutions of the further additional solutions when the certain criteria is met, wherein the selecting of the solution is based on a determined respective score associated with the further additional solutions when the certain criteria is met, where a portion of the selected solution including the plurality of hardware/software resources assigned to the plurality of requesters of hardware/software resources overlap and the selected solution is optimally finalized using machine learning;

utilizing the finalized assignment of the plurality of hardware/software resources to the plurality of requesters; and executing an assignment of the plurality of hardware/software resources to the plurality of requesters as specified in the finalized assignment.

2. The computing device as described by claim 1, wherein the score indicative of fitness of the assignment is based on a balance of work between the plurality of hardware/software resources, capacity associated with each of the plurality of hardware/software resources, bandwidth and physical distance associated with each of the plurality of hardware/software resources and requester pair, and a priority associated with the plurality of requesters of hardware/software resources.

3. The computing device as described by claim 1 wherein the operations further comprise randomly assigning a set of hardware/software resources from another plurality of hardware/software resources to each of a subset of requesters of the plurality of requesters, wherein the assigning the another plurality of hardware/software resources to the subset of requesters remains unchanged until the certain criteria is met.

4. The computing device as described by claim 1, wherein the machine learning algorithm is an evolutionary algorithm.

5. The computing device as described by claim 1, wherein the unsupervised machine learning is a genetic algorithm.

6. A computer-implemented method performed by a computing device including one or more processors and a non-transitory computer-readable medium, the non-transitory computer-readable medium storing machine learning algorithm instructions and an application including a random assignment generator, a score determiner, a subset solution selector, a mutation/mating generator and an assignment finalizer that, when executed by the one or more processors of the computing device, cause the computing device to perform the method comprising:

randomly assigning, by the random assignment generator, a set including a plurality accounts from a plurality of accounts to each of a plurality of representatives to form an account assignment solution, where a portion of the set including the plurality of accounts from the plurality accounts randomly assigned to each of the plurality of representatives overlap;

determining, by the score determiner, a score associated with the account assignment solution, wherein the score is indicative of fitness of the account assignment solution;

repeating, by the random assignment generator, the random assigning of a set of accounts from the plurality of accounts to the plurality of representatives to form an account assignment solution and the determining of the score associated with the account assignment solution a number of times to form a set of solutions, each solution in the set of solutions having a respective score associated therewith;

selecting, by the subset solution selector, a subset of the set of solutions to form a subset of solutions based on the machine learning algorithm instructions of the scores of the plurality of account assignment solutions over the number of times;

creating, by the mutation/mating generator, additional solutions by changing account assignments within the subset of solutions, the changing of account assignments within the subset of solutions includes randomly swapping the sets of accounts in the account assignments between the plurality of representatives within the subset solutions, including (i) randomly swapping sets of accounts between different representatives within a same solution and (ii) randomly swapping sets of accounts between different representatives from a different solution;

determining, by the score determiner, scores associated with the additional solutions;

repeating, by the respective subset solution selector, mutation/mating generator, and score determiner, the selecting, the creating, and the determining scores for further additional solutions, based on the machine learning algorithm of the scores of the plurality of account assignments, until a certain criteria is met, the criteria being one or more of an expiration of a threshold period, a determined number of iterations, and an improvement from one iteration to a next iteration based on the determined score is less than a determined threshold;

finalizing, by the assignment finalizer, assigning of the plurality of accounts to the plurality of representatives by selecting a solution from a latest set of solutions of the further additional solutions when the certain criteria is met, wherein the selecting the solution is based on a determined respective score associated with the further additional solutions when the certain criteria is met, where a portion of the selected solution including the plurality of accounts assigned to the plurality of representatives overlap and the selected solution is optimally finalized using machine learning;

utilizing the finalized assignment of the plurality of accounts to the plurality of representatives; and executing an assignment of the plurality of accounts to the plurality of representatives as specified in the finalized assignment.

7. The method as described by claim 6, wherein the score indicative of fitness of the assignment is based on expertise of respective representative, a balance of work between the plurality of representatives, distance associated with accounts and the plurality of representatives, and an account value.

8. The method as described by claim 6 wherein the operations further comprise randomly assigning, by the at least one processor, a set of accounts from another plurality of accounts to a subset of representatives of the plurality of representatives, wherein the assigning the another plurality of accounts to the subset of representatives remains unchanged until the certain criteria is met.

9. The method as described by claim 6, wherein the machine learning algorithm is an unsupervised machine learning algorithm.

10. The method as described by claim 6, wherein the machine learning algorithm is an evolutionary algorithm.

11. The method as described by claim 6, wherein the machine learning algorithm is a genetic algorithm.

12. The method as described by claim 6, wherein the method further comprises receiving a user input, wherein the user input is used in determining the score.

13. A non-transitory computer-readable medium having stored therein machine learning algorithm instructions and an application including a random assignment generator, a score determiner, a subset solution selector, a mutation/mating generator, and an assignment finalizer that, when executed by one or more processors of a computer, cause the computer to perform a method comprising:
- randomly assigning, by the random assignment generator, a set of hardware/software resources from a plurality of hardware/software resources to each of a plurality of requesters of hardware/software resources to form a hardware/software resources assignment solution, where a portion of the set including the plurality of hardware/software resources from the plurality of hardware/software resources randomly assigned to each of the plurality of requesters of hardware/software resources overlap;
- determining, by the score determiner, a score associated with the hardware/software resources assignment solution, wherein the score is indicative of fitness of the hardware/software resources assignment solution;
- repeating, by the random assignment generator, the random assigning of a set of hardware/software resources from the plurality of hardware/software resources to the plurality of requesters of hardware/software resources to form a hardware/software resources assignment solution and the determining of the score associated with the hardware/software resources assignment solution a number of times to form a set of solutions, each solution in the set of solutions having a respective score associated therewith;
- selecting, by the subset solution selector, a subset of the set of solutions to form a subset of solutions based on an unsupervised machine learning of the scores of the plurality of hardware/software resources assignment solutions over the number of times;
- creating, by the mutation/mating generator, additional solutions by changing hardware/software resource assignments within the subset of solutions, the changing of hardware/software resource assignments within the subset of solutions includes randomly swapping the sets of hardware/software resources in the hardware/software resource assignments within the subset of solutions between the plurality of requesters of hardware/software resources within the subset solutions, including at least one of (i) randomly swapping sets of hardware/software resources between different requestors within a same solution and (ii) randomly swapping sets of hardware/software resources between different requestors from a different solution;
- determining, by the score determiner, scores associated with the additional solutions;
- repeating, by the respective solution selector, mutation/mating generator, and score determiner, the selecting, the creating, and the determining of scores for further additional solutions, based on the unsupervised machine learning of the scores of the plurality of hardware/software resource assignments, until a certain criteria is met, the criteria being one or more of an expiration of a threshold period, a determined number of iterations, and an improvement from one iteration to a next iteration based on the determined score is less than a determined threshold;
- finalizing by the assignment finalizer, assigning of the plurality of hardware/software resources to the plurality of requesters by selecting a solution from a latest set of solutions of the further additional solutions when the certain criteria is met, wherein the selecting of the solution is based on a determined respective score associated with the further additional solutions when the certain criteria is met, where a portion of the selected solution including the plurality of hardware/software resources assigned to the plurality of requesters of hardware/software resources overlap and the selected solution is optimally finalized using machine learning;
- utilizing the finalized assignment of the plurality of hardware/software resources to the plurality of requesters; and
- executing, by the one or more processors, an assignment of the plurality of hardware/software resources to the plurality of requesters as specified in the finalized assignment.

14. The medium of claim 13, wherein the score indicative of fitness of the assignment is based on a balance of work between the plurality of hardware/software resources, capacity associated with each of the plurality of hardware/software resources, bandwidth and physical distance associated with each of the plurality of hardware/software resources and requester pair, and a priority associated with the plurality of requesters of hardware/software resources.

15. The medium of claim 13, wherein the instructions stored therein when executed cause a computer to perform a method further comprising randomly assigning a set of hardware/software resources from another plurality of hardware/software resources to each of a subset of requesters of the plurality of requesters, wherein the assigning the another plurality of hardware/software resources to the subset of requesters remains unchanged until the certain criteria is met.

16. The medium of claim 13, wherein the machine learning algorithm is an evolutionary algorithm.

* * * * *